(12) United States Patent
Fernandes et al.

(10) Patent No.: US 9,672,571 B2
(45) Date of Patent: Jun. 6, 2017

(54) SYSTEM AND METHOD TO PROVIDE VEHICLE TELEMATICS BASED DATA ON A MAP DISPLAY

(71) Applicant: HARTFORD FIRE INSURANCE COMPANY, Hartford, CT (US)

(72) Inventors: Steven J. Fernandes, West Hartford, CT (US); Steven R. Feero, Cheshire, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

(21) Appl. No.: 14/828,241

(22) Filed: Aug. 17, 2015

(65) Prior Publication Data

US 2015/0363886 A1 Dec. 17, 2015

Related U.S. Application Data

(63) Continuation of application No. 14/281,501, filed on May 19, 2014, now Pat. No. 9,111,316, which is a continuation of application No. 13/529,136, filed on Jun. 21, 2012, now Pat. No. 8,731,768.

(60) Provisional application No. 61/650,040, filed on May 22, 2012.

(51) Int. Cl.
  *G06Q 40/08* (2012.01)
  *B60W 40/09* (2012.01)
  *G08G 5/00* (2006.01)
  *G07C 5/00* (2006.01)

(52) U.S. Cl.
  CPC ............ *G06Q 40/08* (2013.01); *B60W 40/09* (2013.01); *G07C 5/00* (2013.01); *G08G 5/0039* (2013.01)

(58) Field of Classification Search
  CPC ..... G08G 5/0039; B60W 40/09; G06Q 40/08; G07C 5/00
  USPC .......................................................... 705/4
  See application file for complete search history.

(56) References Cited

U.S. PATENT DOCUMENTS

| | | | |
|---|---|---|---|
| 5,797,134 A | 8/1998 | McMillan et al. |
| 6,021,397 A | 2/2000 | Jones et al. |
| 6,064,970 A | 5/2000 | McMillan et al. |
| 6,868,386 B1 | 3/2005 | Henderson et al. |
| 7,523,159 B1 | 4/2009 | Williams et al. |
| 8,044,809 B2 | 10/2011 | Farmer |
| 8,090,598 B2 | 1/2012 | Bauer et al. |
| 8,117,049 B2 | 2/2012 | Berkobin et al. |

(Continued)

OTHER PUBLICATIONS

Kimbell, Elisabeth, The Illinois Fact Book and Historical Almanac, Chicago History 1.3 (Spring 1971): 189.

*Primary Examiner* — Atul Trivedi
(74) *Attorney, Agent, or Firm* — Howard IP Law Group, PC

(57) ABSTRACT

A system and method are disclosed herein to determine an insurance premium discount based on telematics data. The system includes a computer memory and a processor in communication with the computer memory. The computer memory stores data indicative telematics data received from a sensor within a vehicle, including at least one of geo-position information of the vehicle and vehicle kinematics data. The processor is configured to identify safety events and associated safety event locations based on the telematics data. The processor is further configured to display to the driver indications of the safety events on a map display along with indications of safety events associated with other drivers.

20 Claims, 19 Drawing Sheets

(56) References Cited

U.S. PATENT DOCUMENTS

| | | | |
|---|---|---|---|
| 8,140,358 B1* | 3/2012 | Ling | G06Q 40/08 340/439 |
| 8,176,145 B1 | 5/2012 | Stender et al. | |
| 8,248,223 B2* | 8/2012 | Periwal | B60Q 9/00 180/170 |
| 8,290,705 B2 | 10/2012 | Trinko et al. | |
| 8,311,858 B2 | 11/2012 | Everett et al. | |
| 8,630,768 B2* | 1/2014 | McClellan | G01S 5/0027 340/439 |
| 8,907,772 B1 | 12/2014 | Green et al. | |
| 9,147,298 B2* | 9/2015 | Ricci | B60Q 1/00 |
| 2001/0042785 A1 | 11/2001 | Walker et al. | |
| 2003/0009270 A1 | 1/2003 | Breed | |
| 2003/0060937 A1 | 3/2003 | Shinada et al. | |
| 2004/0117302 A1 | 6/2004 | Weichert et al. | |
| 2004/0153362 A1* | 8/2004 | Bauer | G06Q 40/02 705/4 |
| 2004/0236474 A1* | 11/2004 | Chowdhary | G06Q 30/0601 701/1 |
| 2004/0236475 A1 | 11/2004 | Chowdhary | |
| 2004/0254698 A1 | 12/2004 | Hubbard et al. | |
| 2005/0137757 A1 | 6/2005 | Phelan et al. | |
| 2006/0217849 A1 | 9/2006 | Obradovich et al. | |
| 2007/0027583 A1 | 2/2007 | Tamir et al. | |
| 2007/0282638 A1 | 12/2007 | Surovy | |
| 2008/0119983 A1* | 5/2008 | Inbarajan | G07C 5/008 701/36 |
| 2008/0319602 A1 | 12/2008 | McClellan et al. | |
| 2008/0319665 A1 | 12/2008 | Berkobin et al. | |
| 2009/0024273 A1* | 1/2009 | Follmer | G06Q 10/10 701/33.4 |
| 2009/0150023 A1 | 6/2009 | Grau et al. | |
| 2010/0030582 A1* | 2/2010 | Rippel | G06Q 40/08 705/4 |
| 2010/0030586 A1 | 2/2010 | Taylor et al. | |
| 2010/0036599 A1 | 2/2010 | Froeberg et al. | |
| 2010/0100319 A1 | 4/2010 | Trinko et al. | |
| 2010/0100398 A1 | 4/2010 | Auker et al. | |
| 2010/0131301 A1 | 5/2010 | Collopy et al. | |
| 2010/0131302 A1 | 5/2010 | Collopy et al. | |
| 2010/0174564 A1* | 7/2010 | Stender | G06Q 40/08 705/4 |
| 2010/0191411 A1 | 7/2010 | Cook et al. | |
| 2010/0205012 A1 | 8/2010 | McClellan | |
| 2010/0238009 A1 | 9/2010 | Cook et al. | |
| 2010/0250021 A1 | 9/2010 | Cook et al. | |
| 2010/0256863 A1* | 10/2010 | Nielsen | G07C 5/085 701/31.4 |
| 2010/0299161 A1 | 11/2010 | Burdick et al. | |
| 2011/0060496 A1 | 3/2011 | Nielsen et al. | |
| 2011/0077028 A1 | 3/2011 | Wilkes, III et al. | |
| 2011/0106370 A1 | 5/2011 | Duddle et al. | |
| 2011/0153367 A1 | 6/2011 | Amigo et al. | |
| 2011/0161116 A1* | 6/2011 | Peak | G06Q 40/08 705/4 |
| 2011/0161118 A1 | 6/2011 | Borden et al. | |
| 2011/0161119 A1 | 6/2011 | Collins | |
| 2011/0208646 A1 | 8/2011 | McMaster et al. | |
| 2011/0213628 A1* | 9/2011 | Peak | G06Q 40/08 705/4 |
| 2011/0273568 A1 | 11/2011 | Lagassey | |
| 2011/0294520 A1 | 12/2011 | Zhou et al. | |
| 2011/0307188 A1 | 12/2011 | Peng et al. | |
| 2012/0036038 A1 | 2/2012 | Farmer | |
| 2012/0072247 A1 | 3/2012 | Rosauer et al. | |
| 2012/0084103 A1* | 4/2012 | Altieri | G06Q 40/08 705/4 |
| 2012/0123806 A1* | 5/2012 | Schumann, Jr. | G08G 1/096775 705/4 |
| 2012/0158436 A1 | 6/2012 | Bauer et al. | |
| 2012/0209634 A1 | 8/2012 | Ling et al. | |
| 2012/0214463 A1 | 8/2012 | Smith et al. | |
| 2012/0253861 A1 | 10/2012 | Davidson et al. | |
| 2012/0259665 A1 | 10/2012 | Pandhi et al. | |
| 2012/0323763 A1 | 12/2012 | Michael | |
| 2013/0006674 A1 | 1/2013 | Bowne et al. | |
| 2013/0006675 A1 | 1/2013 | Bowne et al. | |
| 2013/0013347 A1 | 1/2013 | Ling et al. | |
| 2013/0013348 A1 | 1/2013 | Ling et al. | |
| 2013/0046559 A1 | 2/2013 | Coleman et al. | |
| 2013/0069773 A1* | 3/2013 | Li | B60K 28/02 340/426.1 |
| 2013/0274955 A1 | 10/2013 | Rosenbaum | |
| 2013/0289862 A1 | 10/2013 | Chapman et al. | |
| 2013/0304515 A1 | 11/2013 | Gryan et al. | |
| 2013/0317862 A1 | 11/2013 | Fernandes et al. | |
| 2014/0121857 A1* | 5/2014 | Iachini | B60R 25/20 701/1 |
| 2014/0142989 A1* | 5/2014 | Grosso | G06Q 40/00 705/4 |
| 2014/0309849 A1 | 10/2014 | Ricci | |
| 2015/0032366 A1* | 1/2015 | Man | H04W 4/046 701/412 |
| 2015/0112731 A1 | 4/2015 | Binion et al. | |

* cited by examiner

| DRIVER ID 1902 | POLICY ID 1904 | SAFETY EVENT 1906 | DATE AND TIME 1908 | LOCATION 1910 |
|---|---|---|---|---|
| D101 | P901 | HARD BRAKE | JULY 2, 2015 12:05 PM | 41.2814° N 73.4986° W |
| D101 | P901 | SPEEDING | JULY 3, 2015 2:22 PM | 41.2827° N 73.4974° W |
| D101 | P901 | HARD BRAKE | JULY 3, 2015 3:10 PM | 41.2815° N 73.4987° W |
| D101 | P901 | HARD BRAKE | JULY 4, 2015 8:36 AM | 41.2854° N 73.4928° W |

SYSTEM AND METHOD TO PROVIDE VEHICLE TELEMATICS BASED DATA ON A MAP DISPLAY

CROSS-REFERENCE TO RELATED APPLICATIONS

This application is a continuation of co-pending U.S. patent application Ser. No. 14/281,501, filed May 19, 2014, titled "System and Method to Provide Event Data on a Map Display," which is a continuation of U.S. patent application Ser. No. 13/529,136, filed Jun. 21, 2012, now U.S. Pat. No. 8,731,768, issued May 20, 2014, titled "System and Method to Provide Telematics Data on a Map Display," which claims the benefit of U.S. Provisional Application No. 61/650,040 titled "System and Method Associated with Telematics Data," filed May 22, 2012, the entire contents of all of which are incorporated herein by reference for all purposes.

FIELD OF THE INVENTION

In general, the invention relates to a computerized system and method for providing telematics data on a map display.

BACKGROUND OF THE INVENTION

The insurance industry has begun exploring the use of telematics sensors and other location-aware devices in motor vehicles as a way of determining driver behavior and, from this, driver risk for the purposes of underwriting, pricing, renewing, and servicing vehicle insurance. The devices can capture very high frequency information on location, speed, vehicle handling, vehicle characteristics, and other factors, which can be used in setting vehicle insurance rates. This data may be used to identify safety events, such as a moment of relatively high deacceleration (e.g., a "hard brake" event). The data may also indicate if a vehicle is often driven during times of relatively high risk (e.g., late at night) and/or at speeds above a pre-determined threshold (e.g., above 75 miles per hour). It can be difficult to encourage drivers to provide such data and/or to adjust driving habits in ways that may lower risk. The relationships between telematics data (e.g., where and when safety events occur) and the real world can be difficult for a driver to understand. For example, a driver might not realize that he frequently makes abrupt stops at a particular intersection.

SUMMARY

Therefore, there is a need in the art for ways to encourage drivers to provide telematics information and/or modify behaviors so as to reduce a likelihood of accidents and losses. Such measures may, according to some embodiments, use safety events calculated from location information and/or other vehicle data, such as speed, orientation, and acceleration. Statistical analysis of the data may be used to classify safety events as being associated with different intensity levels.

In some embodiments, a processor may receive data indicative of telematics data collected from a sensor coupled to a vehicle, wherein the telematics data includes at least one of geo-position information and kinematics data. The processor may identify safety events and associated safety event locations based on the telematics data. Indications of the safety events may then be displayed to a driver on a map display and/or a telematics calculator.

According to another aspect, the invention relates to computerized methods for carrying out the functionalities described above. According to another aspect, the invention relates to non-transitory computer readable medium having stored therein instructions for causing a processor to carry out the functionalities described above.

BRIEF DESCRIPTION OF THE DRAWINGS

FIG. 19 is a tabular portion of a telematics database in accordance with some embodiments.

DESCRIPTION OF CERTAIN ILLUSTRATIVE EMBODIMENTS

To provide an overall understanding of the invention, certain illustrative embodiments will now be described, including systems and methods for determining an insurance premium discount using geo-spatial information and/or other telematics data. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
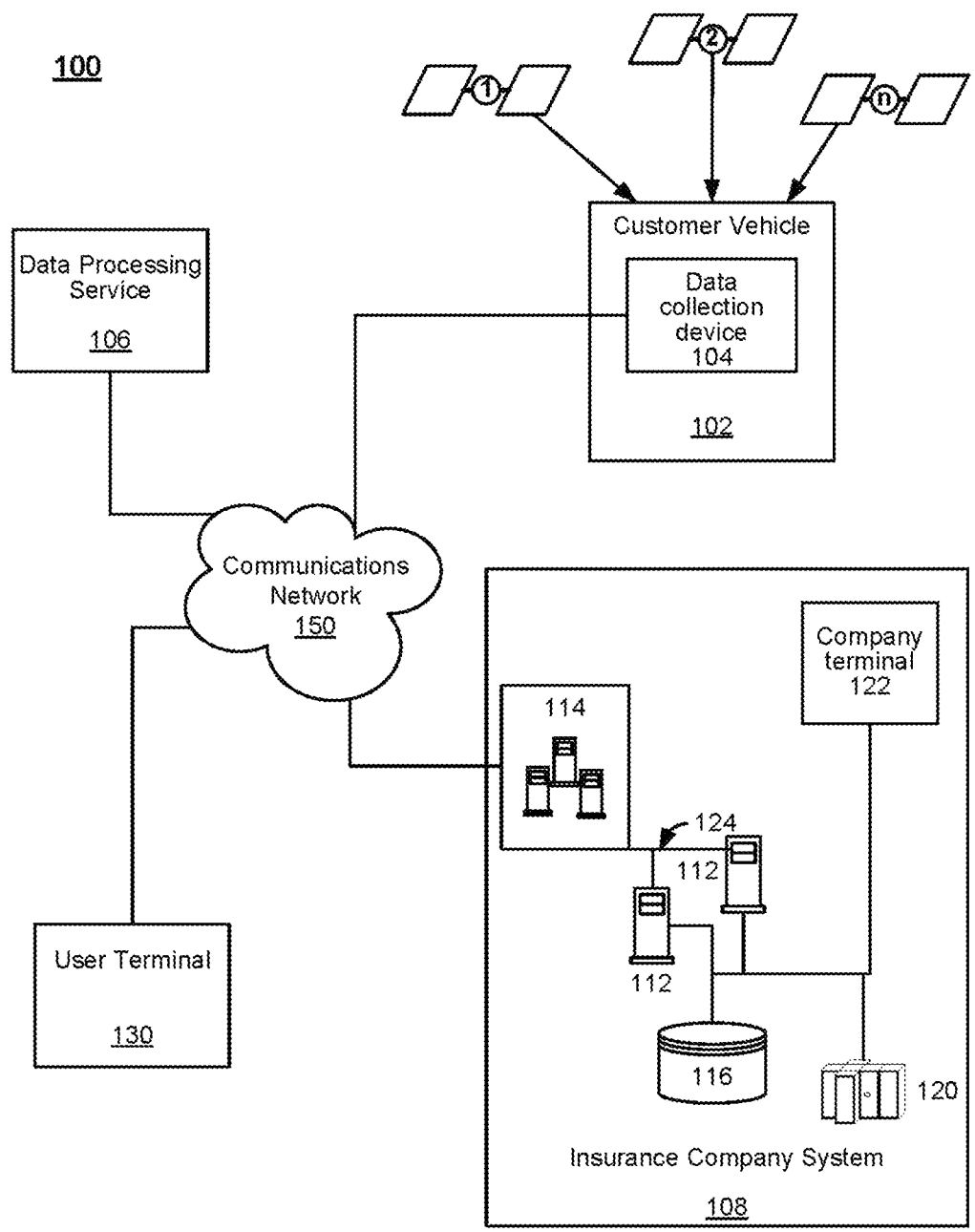
FIG. 1 is an architectural model of a system for determining a discount for an insurance premium based on telematics data, according to an illustrative embodiment of the invention.

FIG. 1 is a block diagram of a system 100 for determining a discount for an insurance premium based on telematics data according to an illustrative embodiment. The system 100 uses data collected along multiple trips traveled by a vehicle, including, for example, speeding information, time of day information, and/or safety event information. An insurance company may use route data, such as Global Positioning Satellite ("GPS") latitude and longitude data, acceleration/deceleration data, speed data, and/or vehicle orientation data collected along a route traveled by the vehicle to determine safety associated with a driver and/or a vehicle. With a sufficient amount of data, the insurance company can calculate a level of risk score for the driver based on, for example, the driver's driving habits. The insurance company can use the score for setting or adjusting a discount value to be applied to an insurance premium. In some implementations, a score or discount is determined by a third party data processing service. In addition, the score or discount may be set by an underwriter, which may be a part of the insurance company or otherwise affiliated with or in a third party arrangement with the insurance company. According to any embodiments described here, a score might be used to determine a premium price, a premium adjustment, and/or any other benefit that may be associated with an insurance policy (e.g., a decreased deductable value or increased overall coverage amount).

The system 100 includes one or more vehicles 102, each having a data collection device 104. The vehicle 102 may be an automobile, motorcycle, truck, bus, watercraft, aircraft, or any other vehicle operated by a driver. A data collection device 104 is coupled to a vehicle 102 for collecting data about the vehicle's location, movements, or other information that can be used to determine risk scores. For vehicles with multiple drivers, the data may be associated with the vehicle itself or with the individual drivers. The data collection device 104 may be positioned inside the vehicle 102, attached to the outside of the vehicle 102, or integrated into the vehicle 102. The data collection device 104 is in communication with an insurance company system 108 over a communication network 150. The data collection device 104 may communicate with the insurance company system 108 though a wireless network such as a cellular network or using a wireless Internet connection. In general, the data collection device 104 can be any computing device or plurality of computing devices in cooperation having a data collection sensor (e.g., an antenna or an accelerometer), a processor, a memory, and a means for transmitting the collected data. The customer vehicle 102 or data collection device 104 may include an antenna for receiving signals from Global Navigation Satellite System ("GNSS") satellites, numbered 1 through "n" in FIG. 1. In one implementation, the data collection device 104 is also configured to process the collected data. In some embodiments, the data processing protects the driver's privacy by encrypting the data, removing location information, producing summary information, or taking other measures to reduce the likelihood that location information, speed information, or other sensitive information are received by the insurance company or third parties.

In some embodiments, rather than sending collected data directly to the insurance company system 108, the data collection device 104 sends collected data to a data processing service 106, which processes the data to determine a risk score and/or an appropriate premium discount for a driver that is then sent to the insurance company system 108. This can help protect a driver's privacy, since the insurance company does not get detailed data about a driver's location, but only receives summary information. Using a data processing service 106 is in some implementations also preferable to having the data collection device 104 process data to output a risk score because it reduces the processing power needed by data collection device 104 and because using a third party data processing service 106 may also make it more difficult for drivers to tamper with the data. The data processing service 106 can perform additional monitoring functions, such as vehicle security monitoring or providing location-based alerts (e.g., alerting a parent or employer when a vehicle travels an unusual path) and/or speed alerts. Note that an insurance company might received detailed reports from the third party data processing service 106, summary reports (with certain details removed), and/or supplemented information (e.g., including information from one or more public databases).

The insurance company system 108 includes a plurality of application servers 112, a plurality of load balancing proxy servers 114, an insurance company database 116, a processing unit 120, and company terminal 122. These computing devices are connected by a local area network 124.

The application servers 112 are responsible for interacting with the data collection device 104 and/or the data processing service 106. The data exchange between the insurance company system 108 and data collection device 104 and/or data processing service 106 can utilize push and pull technologies where the application servers 112 of the insurance company system 108 can act as both a server and client for pushing data to the data processing service 106 (e.g., which vehicles to monitor, when to stop data collection, rules for monitoring services requested by the customer) and for pulling data from the data processing service 106. The application servers 112 or other servers of the insurance company system 108 can request to receive periodic data feeds from the data collection device 104 and/or data processing service 106. The communication between the application servers 112 and the data processing service 106 can follow various known communication protocols, such as TCP/IP. Alternatively, the application servers 112 and data processing service 106 can communicate with each other wirelessly, e.g., via cellular communication, Wi-Fi, Wi-Max, or other wireless communications technologies or combination of wired or wireless channels. The load balancing proxy servers 114 operate to distribute the load among application servers 112.

The insurance company database 116 stores information about vehicular insurance policies. For each insurance policy, the database 116 includes for example and without limitation, the following data fields: policy coverage, a risk rating, policy limits, deductibles, the agent responsible for the sale or renewal, the date of purchase, dates of subsequent renewals, product and price of product sold, applicable automation services (for example, electronic billing, automatic electronic funds transfers, centralized customer service plan selections, etc.), customer information, customer payment history, or derivations thereof. Note that any of the embodiments described herein might be associated with existing insurance policies, newly issued insurance policies, and/or policies that have not yet been issued (e.g., during a trial phase before a policy is issued). According to some embodiments, information collected during a trial period may influence a discount or other benefit that is eventually associated with an insurance policy.

The processing unit 120 is configured for determining the price of an insurance premium based on a risk rating for a driver or vehicle. The processing unit 120 may comprise multiple separate processors, such as a risk or safety processor, which may calculates a safety rating from raw or processed data from the data collection device 104 or data processing service 106 over the communications network 150; and a business logic processor, which determines a premium price for a policyholder based on, among other things, a risk score. In some embodiments, insurance premium prices or information for making insurance pricing determinations may be generated by a third-party underwriter, which is separate from the insurance company system 108. An exemplary implementation of a computing device for use in the processing unit 120 is discussed in greater detail in relation to FIG. 2.

The company terminals 122 provide various user interfaces to insurance company employees to interact with the processing system 120. The interfaces include, without limitation, interfaces to review telematics data, or risk ratings; to retrieve data related to insurance policies; to manually adjust a risk rating; and to manually adjust premium pricing. In some instances, different users may be given different access privileges. For example, marketing employees may only be able to retrieve information on insurance policies but not make any changes to data. Such interfaces may be integrated into one or more websites for managing the insurance company system 108 presented by the application servers 112, or they may be integrated into thin or thick software clients or stand-alone software. The company terminals 122 can be any computing devices suitable for carrying out the processes described above, including personal computers, laptop computers, tablet computers, smartphones, servers, and other computing devices.

The user terminal 130 provides various user interfaces to customers to interact with the insurance company system 108 over the communications network 150. Potential customers can use user terminals 130 to retrieve policy and pricing information for insurance policies offered by the insurance company. Customers can enter information pertaining to changes in their insurance policy, e.g., changes in policy coverage, addition or subtraction of drivers, addition or subtraction of vehicles, relocation, mileage information, etc. Customers can also use the user terminal 130 for a pay-as-you-go insurance policy in which customers purchase insurance by the trip or mile.

In some embodiments, the data collection device 104 may not be continually connected to the insurance company system 108 via the network 150. For example, the data collection device 104 may be configured to temporarily store data if the data collection device 104 becomes disconnected from the network, like when it travels out of range of cellular towers. When the connection is restored, the data collection device 104 can then transmit the temporarily stored data to the insurance company system 108. The data collection device 104 may alternatively be configured to connect to the communications network 150 through a user's home Wi-Fi network. In this case, the data collection device 104 stores trip data until it returns to the vicinity of the user's home, connects to the user's wireless network, and sends the data. In some embodiments, the data collection device 104 is not connected to the network 150 at all, but rather, data collected is transmitted to the insurance company though other means. For example, a customer can receive a data collection device 104 from the insurance company, couple the device 104 to his car for a set period of time or number of miles, and then either mail the device 104 with the collected data to the insurance company system 108 or extract and send the collected data to the insurance company system 108 via mail, email, or though a website.

Figure 2:
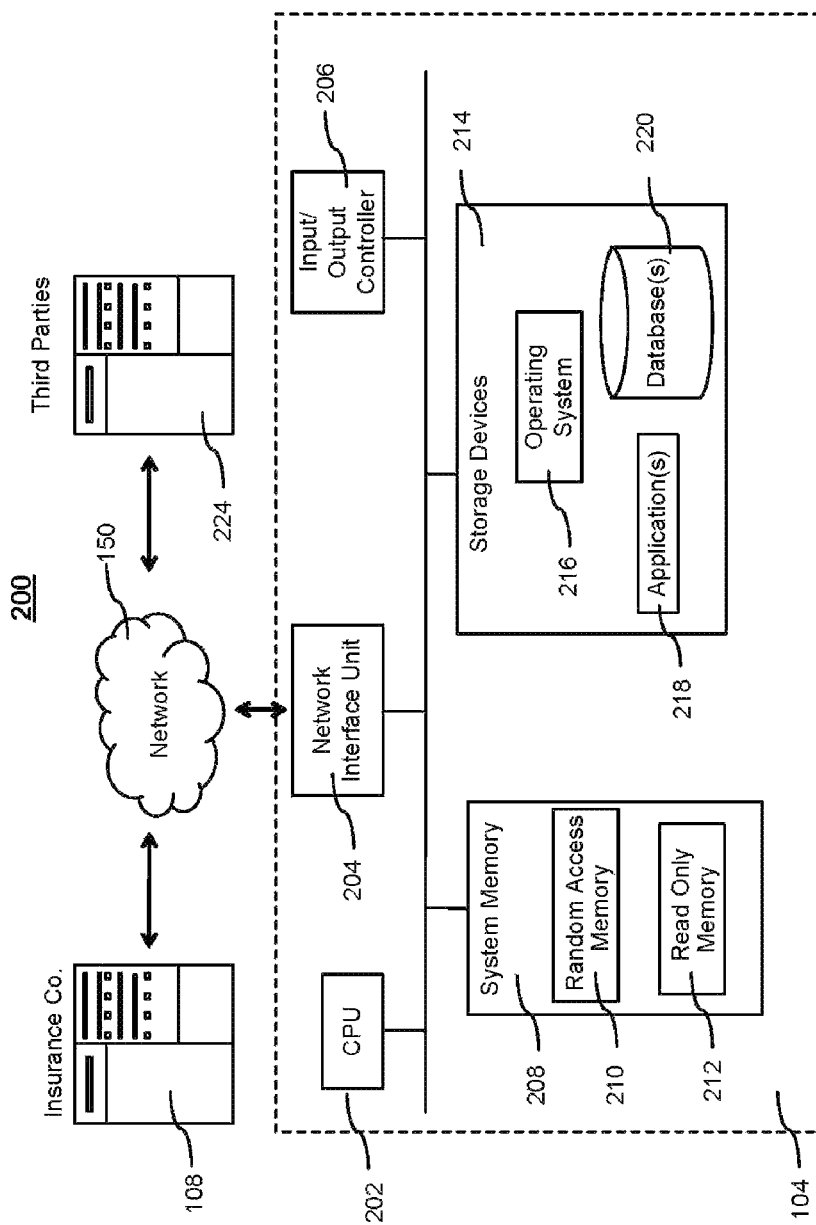
FIG. 2 is a block diagram of a computing system as used in FIG. 1, according to an illustrative embodiment of the invention.

FIG. 2 is a block diagram of a computing device 200 used for carrying out at least one of an insurance premium discount determination and business logic processing described in relation to FIG. 1, according to an illustrative embodiment of the invention. The computing device 200 comprises at least one network interface unit 204, an input/output controller 206, system memory 208, and one or more data storage devices 214. The system memory 208 includes at least one Random Access Memory ("RAM") 210 and at least one Read-Only Memory ("ROM") 212. All of these elements are in communication with a Central Processing Unit ("CPU") 202 to facilitate the operation of the computing device 200. The computing device 200 may be configured in many different ways. For example, the computing device 200 may be a conventional standalone computer or alternatively, the functions of computing device 200 may be distributed across multiple computer systems and architectures. The computing device 200 may be configured to perform some or all of the insurance premium discount determination and business logic processing, or these functions may be distributed across multiple computer systems and architectures. In the embodiment shown in FIG. 2, the computing device 200 is linked, via network 150 or local network 124, to other servers or systems housed by the insurance company system 108, such as the load-balancing server 114, and/or the application servers 112.

The computing device 200 may be configured in a distributed architecture, wherein databases and processors are housed in separate units or locations. The computing device 200 may also be implemented as a server located either on site near the insurance company system 108, or it may be accessed remotely by the insurance company system 108. Some such units perform primary processing functions and contain at a minimum a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 202 comprises a processor, such as one or more conventional microprocessors and one or more supplementary co-processors such as math co-processors for offloading workload from the CPU 202. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The CPU 202 may be configured to perform one or more particular processing functions. For example, the computing device 200 may be configured for calculating a risk or safety score for a driver or vehicle. The same computing device 200 or another similar computing device may be configured for calculating an aggregate risk rating based on multiple safety scores (e.g., associated with different clusters of similar routes). The same computing device 200 or another similar computing device may be configured for calculating an insurance premium discount for a vehicle or driver based at least the risk scores and/or the safety rating.

The data storage device 214 may store, for example, (i) an operating system 216 for the computing device 200; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. The database(s) 220 may including all or a subset of data stored in insurance company database 116, described above with respect to FIG. 1, as well as additional data, such as formulas or manual adjustments, used in establishing the insurance risk for a vehicle.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the CPU 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for scoring risk based on telematics data associated with a plurality of trips taken by a vehicle or driver over a period of time. The program also may include program elements such as an operating system, a database management system and "device drivers" that allow the processor to interface with computer peripheral devices (e.g., a video display, a keyboard, a computer mouse, etc.) via the input/output controller 206.

The term "computer-readable medium" as used herein refers to any non-transitory medium that provides or participates in providing instructions to the processor of the computing device (or any other processor of a device described herein) for execution. Such a medium may take many forms, including but not limited to, nonvolatile media and volatile media. Nonvolatile media include, for example, optical, magnetic, or opto-magnetic disks, or integrated circuit memory, such as flash memory. Volatile media include Dynamic Random Access Memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or Electronically Erasable Programmable Read-Only Memory ("EEPROM"), a FLASH-EEPROM, any other memory chip or cartridge, or any other non-transitory medium from which a computer can read.

Various forms of computer readable media may be involved in carrying one or more sequences of one or more instructions to the CPU 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
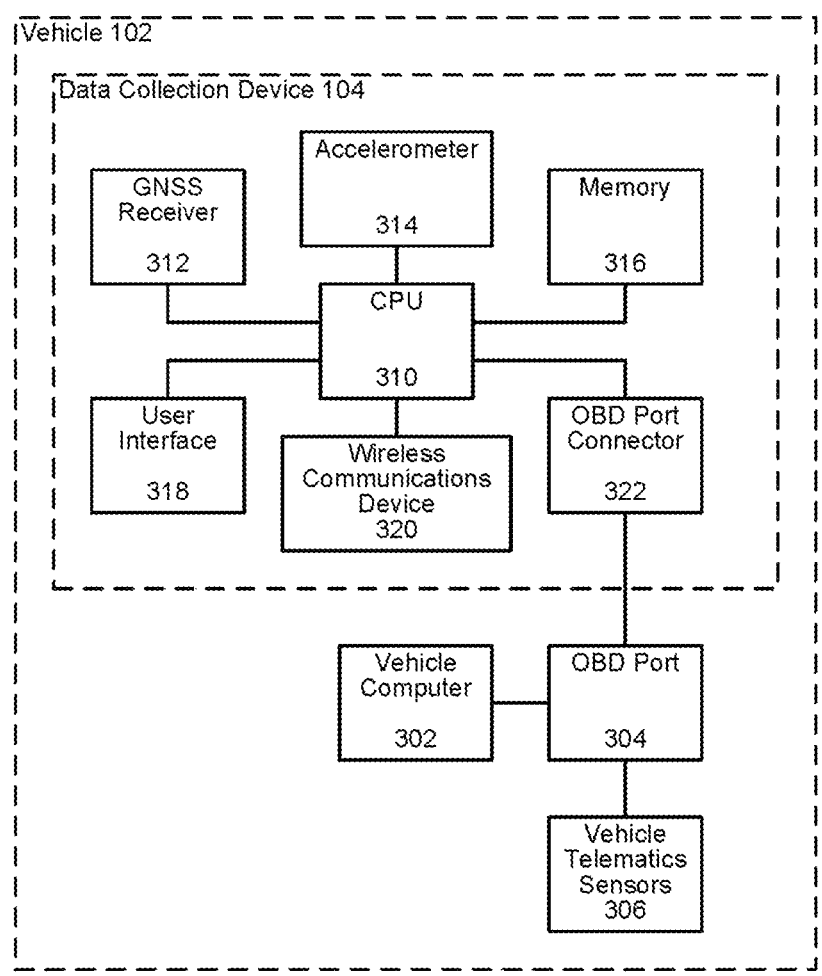
FIG. 3 is a block diagram of a vehicle and a device coupled to the vehicle for collecting telematics data, according to an illustrative embodiment of the invention.

FIG. 3 is a block diagram of a vehicle 102 having a data collection device 104. As described with regard to FIG. 1, the vehicle 102 may be an automobile, motorcycle, truck, bus, watercraft, aircraft, or any other vehicle operated by a driver. The vehicle 102 includes a vehicle computer 302, an On-Board Diagnostics ("OBD") port 304, and vehicle telematics sensors 306. The data collection device 104 is connected to the vehicle 102 via an OBD port connector 322 connected to the OBD port 304 to receive telematics data and other information. The data collection device 104 includes a CPU 310, a GNSS receiver 312, an accelerometer 314, memory 316, a user interface 318, and a wireless communications device 320. The CPU 310 is in communication with the other elements of the data collection device 104 to facilitate the operation of the data collection device 104. The CPU can also be configured to process data received from the GNSS receiver 312, the accelerometer 314, and the OBD port connector 322. Data processing may include calculating risk scores, calculating safety ratings, calculating intermediate values for determining insurance premium discounts, or encrypting data sent by the wireless communications device 320.

The Global Navigation Satellite System ("GNSS") receiver 312 includes an antenna and associated signal processing circuitry for receiving signals from GNSS satellites, such as the satellites numbered 1 through n in FIG. 1, and determining its location from the signals. GNSS satellites may be, for example, GPS, GLONASS, Galileo, or Beidou satellites which send time and orbital data from which the data collection device 104 can calculate its location. In some configurations, the CPU 310 calculates the location of the vehicle from data from the receiver 312. The CPU 310 can pull location data from the GNSS receiver 312 at set time intervals, such as every 0.1 seconds, 0.2 seconds, 0.5 seconds, 1 second, 2 seconds, 7 seconds, or 10 seconds. The CPU 310 sends the location data to the memory 316 along with a time and date stamp indicating when the vehicle was at the location. In some embodiments, the GNSS receiver 312 may be part of a separate GNSS device used by the driver for obtaining driving directions. In this case, the GNSS receiver 312 transmits data to the data collection device 104 though a wired connection or a wireless connection, e.g., BLUETOOTH or Wi-Fi.

The accelerometer 314 is a device that measures proper acceleration. Data collected from an accelerometer 314 may include or be used for obtaining the g-force, acceleration, orientation, shock, vibration, jerk, velocity, speed, and/or position of the vehicle. Some or all of these types of data are received or calculated by the CPU 310. The CPU 310 may collect data at intervals such as every 0.1 seconds, 0.2 seconds, 0.5 seconds, 1 second, 2 seconds, 7 seconds, or 10 seconds and store the data in the memory 316. Each data point is time and date stamped and/or location stamped. In some embodiments, the CPU 310 determines intervals between data stored in the memory 316 based on trends in the data. The rate of data collection may vary based on vehicle behavior; for example, if a driver is travelling along a straight road at a consistent speed, the CPU 310 may save data less frequently than if the driver is making frequent turns. In some embodiments, only "exception data" evident of safety events or other unusual driving behavior is stored. For example, the CPU 310 may only save accelerations, decelerations, hard turns, speeds, lane change speeds, etc. with rates above a certain threshold.

The OBD port connector 322 is used to collect data from the vehicle computer 302 and/or vehicle telematics sensors 306 via OBD port 304. The vehicle computer 302 may provide information about the vehicle's speed, the number of miles traveled, whether the vehicle is running or not, seatbelt usage, airbag deployment, and vehicle diagnostics. Vehicle diagnostics data can be used to determine whether a safety event was caused by the driver's actions or related to a vehicle malfunction, such as low tire pressure, low oil pressure, high engine temperature, loss of power, and stalling. The vehicle may contain additional telematics sensors 306 for, e.g., vehicle tracking, monitoring gasoline consumption, and vehicle safety. Data obtained by the data collection device 104 from the vehicle computer 302 and telematics sensors 306 via the OBD port 304 can supplement or be used instead of data collected by the GNSS receiver 312 and/or accelerometer 314. In some embodiments, the data collection device 104 turns on automatically when the vehicle is turned on; the data collection device 104 may be powered by the vehicle 102.

The data collection device 104 also includes a wireless communications device 320 for sending collected data to and receiving commands from the data processing service 106 and/or insurance company system 108 via the network 150. The data collection device 104 may also be configured for communication with the driver or a passenger via user interface 318. The user interface 318 includes output components, such as a screen or speakers, and input components, such as a touch screen, keyboard, or microphone. The user interface 318 can output risk data, route summary data, vehicle diagnostics data, and any data collected from the GNSS receiver 312, accelerometer 314, and/or OBD port 304. In some embodiments, the data collection device 104 is also a navigation device that can calculate and display a route to a destination inputted by the user.

Figure 4:
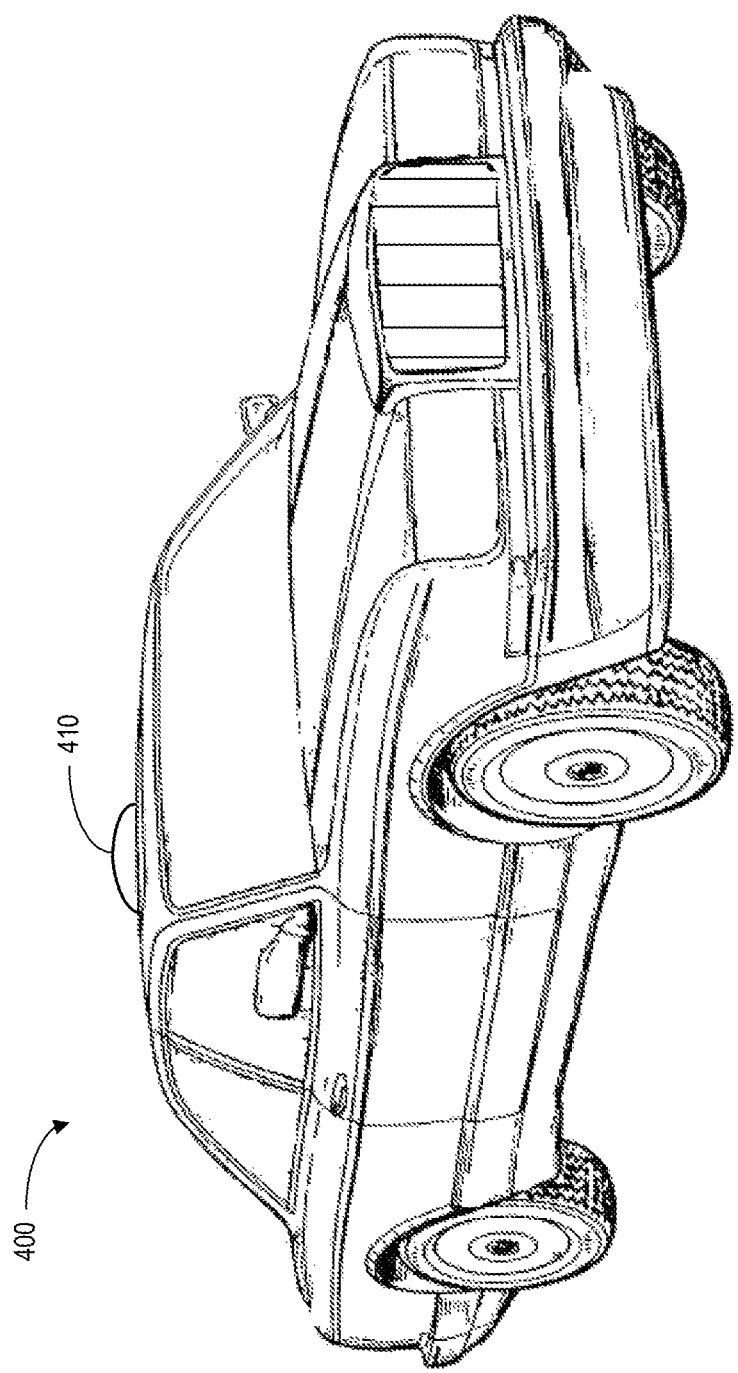
FIG. 4 illustrates an automobile in accordance with some embodiment of the invention.

The vehicle 102 and data collection device 104 may be associated with, for example, an automobile. For example, FIG. 4 illustrates an automobile 400 in accordance with some embodiment of the invention. The automobile 400 includes one or more sensors 410 that may be used to collect telematics information, such as a GNSS receiver or similar device. Note that telematics information might instead be associated with, for example, a motorcycle, a recreational vehicle, a boat, an airplane, etc.

Figure 5:
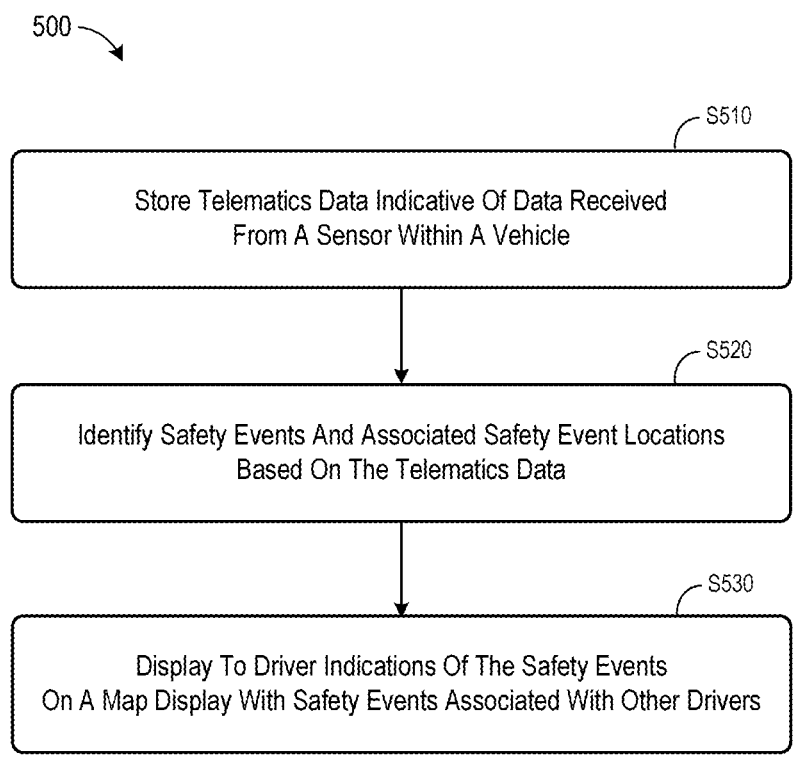
FIG. 5 is a flowchart of a method according to an illustrative embodiment of the invention.

FIG. 5 is a flowchart of a method 500 for displaying telematics data. The method 500 can be performed by the data collection device 104, the data processing service 106, the insurance company system 108, or any combination of these. The method 500 includes the storage of telematics data received from a sensor within the vehicle (Step S510). As used herein, a sensor may be "within" a vehicle if it is attached to the vehicle (e.g., either inside or outside the body of the vehicle), is powered by the vehicle, or is otherwise inside or associated with the vehicle. To obtain telematics data, data from receivers and sensors such as GNSS receiver 312, accelerometer 314, vehicle computer 302, and vehicle telematics sensors 306 may be collected by the data collection device 104 and stored in the memory 306 of the data collection device 306 and/or sent to the data processing service 106 or insurance company system 108. The method 500 further includes identifying safety events and associated safety event locations based on the data indicative of the telematics data (Step S520) and displaying to the driver indications of the safety events on a map display along with indications of safety events associated with other drivers (Step S530). The map display may, for example, further include information from a third party service, such as Google Maps.

According to some embodiments, the safety events displayed on the map display are associated with telematics data. The telematics data might include, for example, times of day associated with driving, velocities associated with driving, distances associated with driving, weather information, and/or traffic information. Moreover, the insurance company might identify safety events within the telematics data (e.g., hard brake events) and/or a severity estimation of the safety events. Moreover, according to some embodiments an insurance platform might output an indication of a suggested driving modification on a map display along with a discount goal for the insurance premium of the automobile insurance policy. For example, the driving modification might include a suggested route to a destination to achieve a 15% discount for an insurance premium. According to some embodiments, a suggested driving modification may be output to other parties instead of or in addition to the driver. For example, a suggested modification might be sent to a parent or employer of the driver (e.g., suggesting that the driver spend less time driving over 75 miles per hour). Similarly, information about telematics data, including safety events, might be automatically forwarded to a community improvement resource (e.g., by sending an email to a state department of transportation indicating that many hard brake events have recently occurred at a particular intersection, perhaps because of a new pothole or other driving hazard). According to some embodiments, information about telematics data, including safety events, might be automatically provided via a social network site (e.g., to help encourage a group of drivers to improve risky driving habits).

According to some embodiments, information about safety events may be displayed to a driver on a map display. For example, referring now to FIG. 6, a diagram 650 depicting a user interface 602 is shown. The user interface 602 may be displayed on device 600 such as a mobile telephone, PDA, personal computer, or the like. For example, the device 600 may be a PC, an IPHONE® from Apple, Inc., a BLACKBERRY® from RIM, a mobile phone using the Google ANDROID® operating system, or the like. The user interface 602 depicts a portion of a map showing a portion of Fairfield County in the State of Connecticut. The user interface 602 may display the location of safety events 654, 656 (e.g., locations of rapid de-acceleration, speeding events, etc.) collected in connection with all drivers who have provided telematics data while driving in that area. In this way, a driver may be alerted and take extra precautions when driving in an area of relatively high risk.

Figure 6:
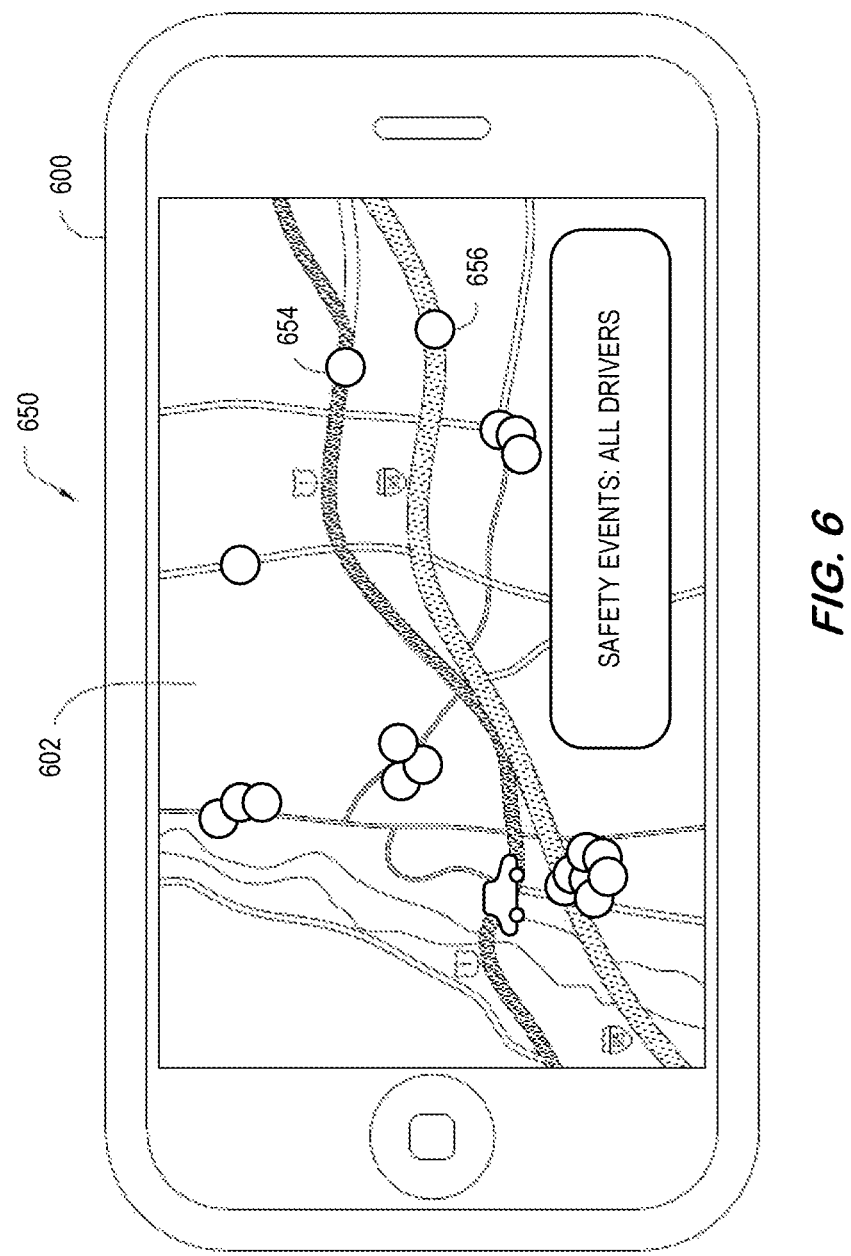
FIGS. 6 through 9 illustrate map displays in accordance with some embodiments described herein.
Figure 7:
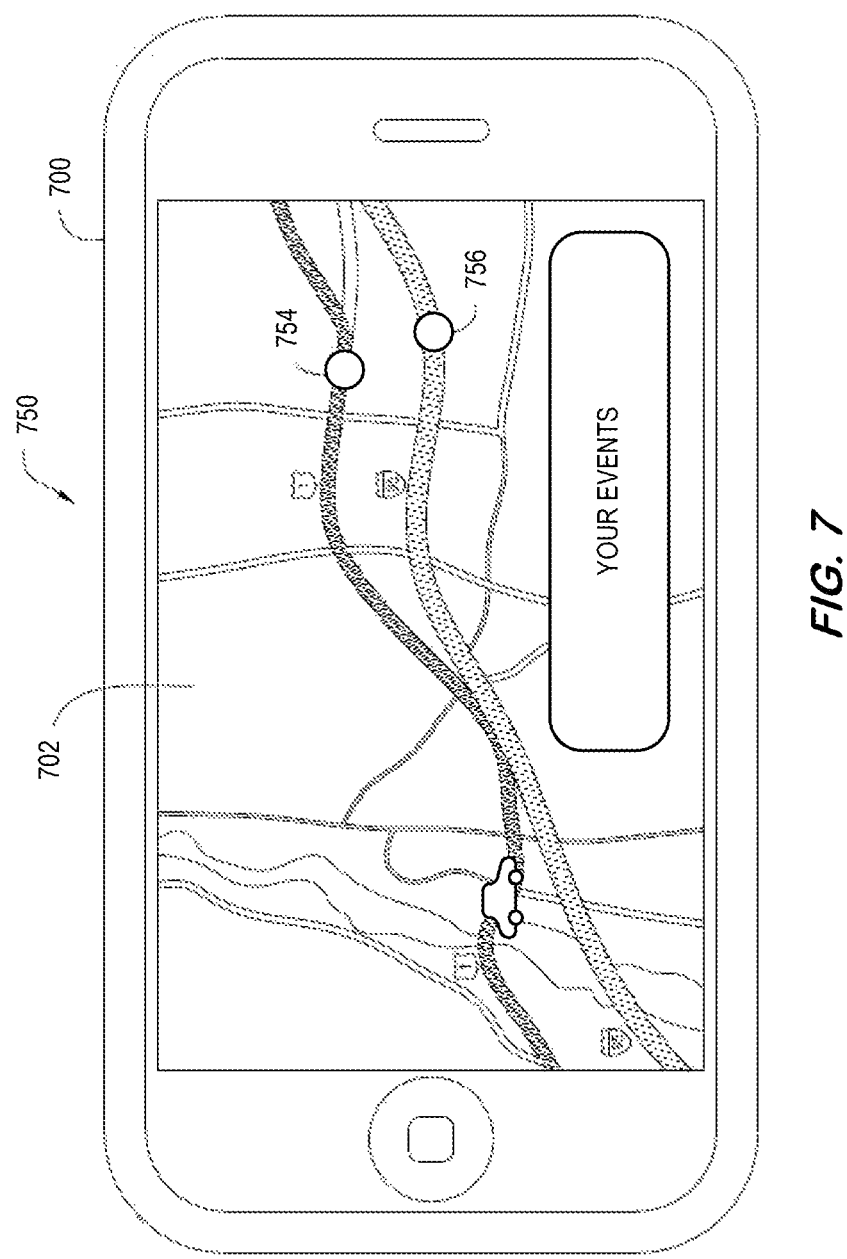

In some embodiments, such as the one depicted in FIG. 6, identified safety events 654, 656 may be associated with a plurality of different event types and a substantial number of drivers. For example, safety events 654, 656 associated with both hard braking events and excessive speeding may be displayed in connections with thousands of drivers. According to some embodiments, information about a plurality of safety events may be grouped and displayed as a single graphical icon. For example, a green circle might indicate that relative few events have been recorded for a particular location while a red circle indicates that many events have occurred there. Similarly, a number representing an overall number of safety events might be displayed on the interface 602. Note that a driver may instead be more interested in his or her own personal safety events. For example, referring now to FIG. 7, a diagram 750 depicting a user interface 702 is shown. As before, the user interface 702 may be displayed on device 700 such as a mobile telephone and may depict a portion of a map. The user interface 702 may display to a driver the location of safety events 754, 756 (e.g., locations of rapid de-acceleration) that were a result of his or her driving habits. In this way, a driver may be become aware of unsafe driving habits and adjust his or her behaviors to reduce the risk of an accident.

Figure 8:
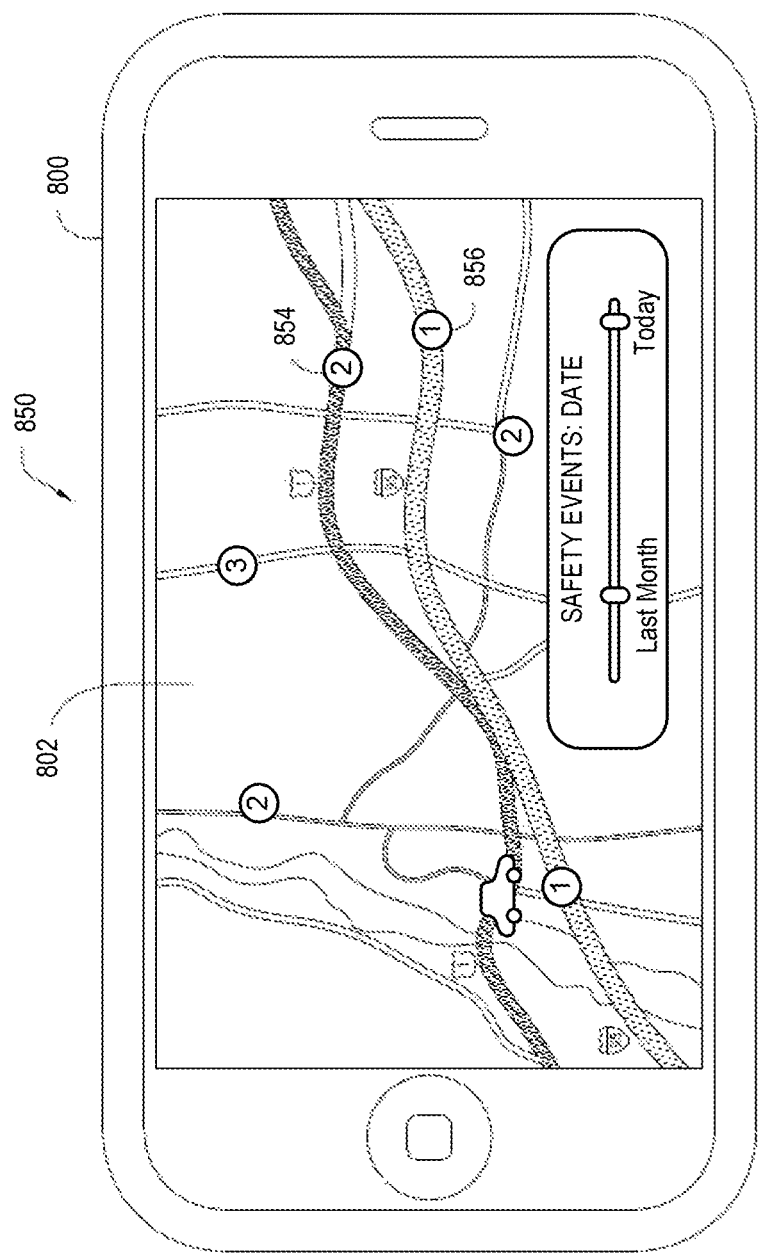

Note that driving habits and conditions may change over time. Thus, according to some embodiments a driver may interact with a map display to view safety events associated with a selected range of dates and/or times. For example, referring now to FIG. 8, a diagram 850 depicting another user interface 802 is shown. As before, the user interface 802 may be displayed on device 800 such as a mobile telephone and may depict a portion of a map. The user interface 802 may display to a driver the location of safety events 854, 856 (e.g., locations of rapid de-acceleration) that occurred during a particular period of time (e.g., during the prior 24 hours, the prior week, the prior month, the prior year, etc.). Note that the safety events 854, 856 might be associated with the driver's own driving habits or may reflect those of all drivers who have provided telematics data. According to some embodiments, a driver may interact with a "sliding scale" bar to select which period of time should be used to filter the safety events 854, 856. Note that the identified safety events 854, 856 may associated with a plurality of different event types. For example, safety events 854, 786 associated with both hard braking events and excessive speeding may be displayed. In this case, different labels (e.g., reflecting event types "1," "2," or "3" as illustrated in FIG. 8), icons, or colors may be used to differentiate event types. Similarly, the safety events 854, 856 may be associated with different levels of risk or severity (e.g., high, medium, and low intensity events) and these may also be differentiated on the user interface 802.

Figure 9:
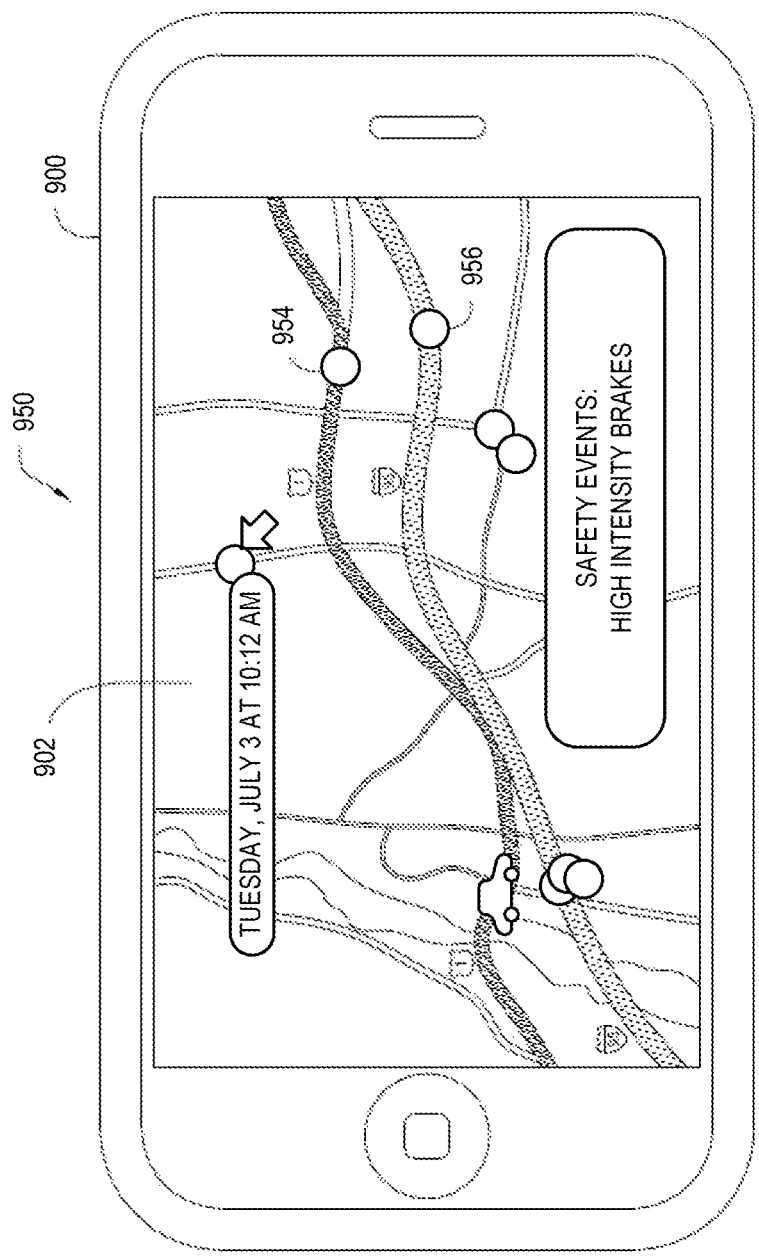

In some cases, a driver might be interested in a particular type of safety event. According to some embodiments, a selection of a particular event type may be received from the driver and only indications of the safety events associated with that particular event type may be displayed to the driver on the map display (e.g., only hard brake events). For example, referring now to FIG. 9, a diagram 950 depicting another user interface 902 is shown. As before, the user interface 902 may be displayed on device 900 such as a mobile telephone and may depict a portion of a map. The user interface 902 may display to a driver the location of safety events 954, 956 (e.g., locations of rapid de-acceleration) that are of particular interest to the driver. In the example of FIG. 9, the driver has selected to view all high intensity brake events. Note that the safety events 954, 956 might be associated with the driver's own driving habits or may reflect those of all drivers who have provided telematics data. Moreover, selection of a particular event icon might result in the display of further details about that particular event (e.g., the date and time the event occurred). In addition to, or instead of, filtering safety events based on event type or severity, a driver might be able to display events associated with a particular type of driver or vehicle (e.g., based on age, driving experience, gender, etc.). Although information about other drivers' safety events may be displayed on the user interface 902, note that such information may be collected and/or provided in an anonymous fashion. For example, data indicative of telematics data might received by an insurance company from a third party such that the data that does not identify particular drivers or vehicles.

Figure 10:
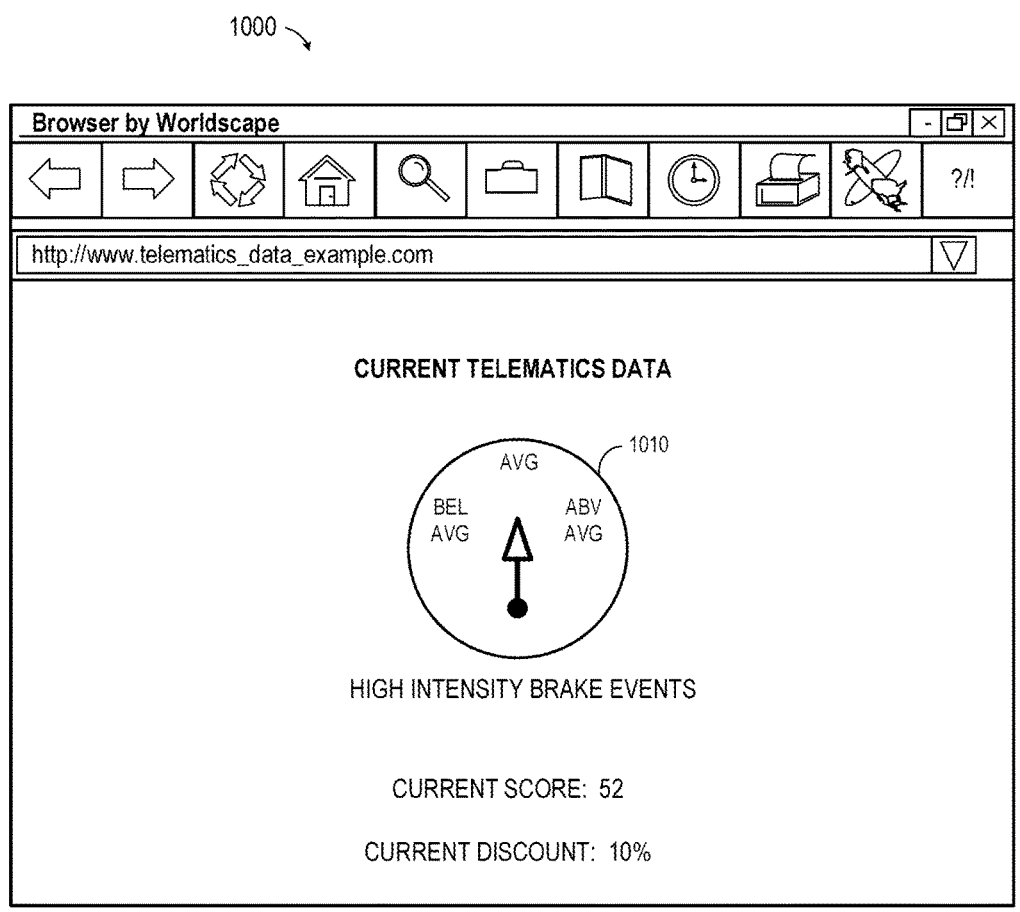
FIGS. 10 and 11 illustrate current telematics displays according to some embodiments.

In addition to the locations where safety events occurred, a driver might be interested in his or her overall performance in connection with one or more types of safety events and/or how that performance compares to others, how that performance is modifying his or her current insurance premium discount, etc. FIG. 10 illustrates a current telematics display 1000 according to some embodiments. In particular, the display 1000 includes a graphical representation 1010 of information about a particular risk variables derived from telematics data which may be categorized as "below average," "average," or "above average" from a risk perspective. The display 1100 also includes a current score (e.g., calculated at least in part based on the risk variable) and a current discount (e.g., determined based on the current score). Note that the graphical representation 1010 might instead be a sliding scale, letter grade ("B+"), or any other type of indication. In addition to, or instead of, a current number of events per week, a driver might be shown an average number of events for all drivers or for a particular type of driver or vehicle (e.g., based on age, driving experience, gender, etc.).

Figure 11:
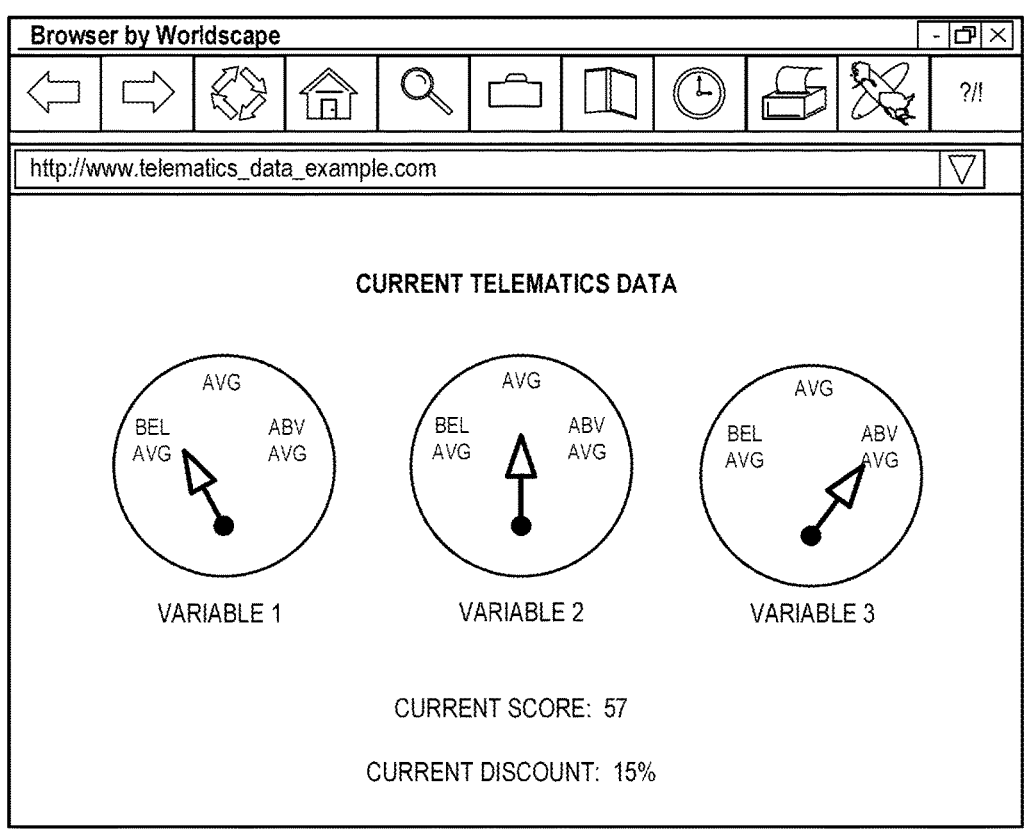

FIG. 11 illustrates another current telematics display 1100 according to some embodiments. In particular, the display 1100 includes a graphical representation of information about three different risk variables derived from telematics data, a current score (e.g., calculated based on the risk variables) and a current discount (e.g., determined based on the current score). The current discount might, according to some embodiments, represent the final discount According to some embodiments, the current discount might be calculated in substantially real time or be recalculated using new data when the driver's safety scores are more likely change, e.g., if the customer moves, changes jobs, has a child, or retires, or at certain time periods, e.g., every year, every two years, every three years, every five years, every ten years, etc. In some embodiments, both prospective pricing and retroactive pricing are used. For example, a customer being continually monitored can be receive a premium discount for a time period based on one or more past safety scores, and if the customer's actual score rating for the time period was greater than or less than the expected rating, an adjustment may be applied as appropriate.

By way of example only, a score model might consist of two main elements: (1) a percentage of time speeding over a threshold value (e.g., 75 miles per hour) and (2) an annualized miles value associated with times of day. Each driver's score might, for example, start with fifteen (15) points then be modified by adding speeding points and/or subtracting time of day mileage by the factors shown below:

For Time of Day:

| Risk Level | Per Mile Subtraction |
|---|---|
| Risky | 0.005 |
| Moderate | 0.0025 |
| Low | 0.00125 |

Where "risky" is defined as driving between midnight and 4:00 am every day of the week, "moderate" is driving from 4:00 am to 6:00 am and 9:00 pm to midnight every day of the week and 6:00 am to 9:00 am and 3:00 pm to 6:00 pm on weekdays. "Low" risk times may comprise all other times of the day.

For Speeding Over a Threshold:

| % Time | Speeding Points |
|---|---|
| >0.75% | 0 |
| 0.1-0.75% | 5 |
| <0.1% | 10 |

In such an example, consider a driver who drives 5,000 annualized miles. Moreover, 4,000 of these miles are driven during moderate risk times of the day and 1,000 of these miles are driven during low risk times of the day. Moreover, the driver speeds over the threshold 0.05% of the time. In this case, a safety score might be determined as follows:

Safety Score=15+10−(4,000*0.0025+1,000*0.00125)=13.75

Rounding this to the nearest whole number and looking it up in a risk/discount table, the driver might receive a 14% discount for his or her insurance premium.

As another example, aggressive driving/hard braking events might be classified into different intensity or severity levels. For example, a type 1 event might have a threshold of from 340 to 500 mille-g (~change in speed or velocity (delta-V) of greater than +/−7.5 mph/sec2) (e.g., from 14 mph to 25 mph in 1 second). A type 2 event might have a threshold of from 501 to 750 milli-g (~change in speed or velocity (delta-V) of greater than +/−11 mph/sec$^2$) (e.g., from 65 mph to 45 mph in 1 second). A type 3 event might have a threshold of 750 milli-g (~change in speed or velocity (delta-V) of greater than +/−16.5 mph/sec$^2$) (e.g., from 65 mph to 35 mph in 1 second). The severity of the event may then be used when determining an insurance premium discount of the driver.

Figure 12:
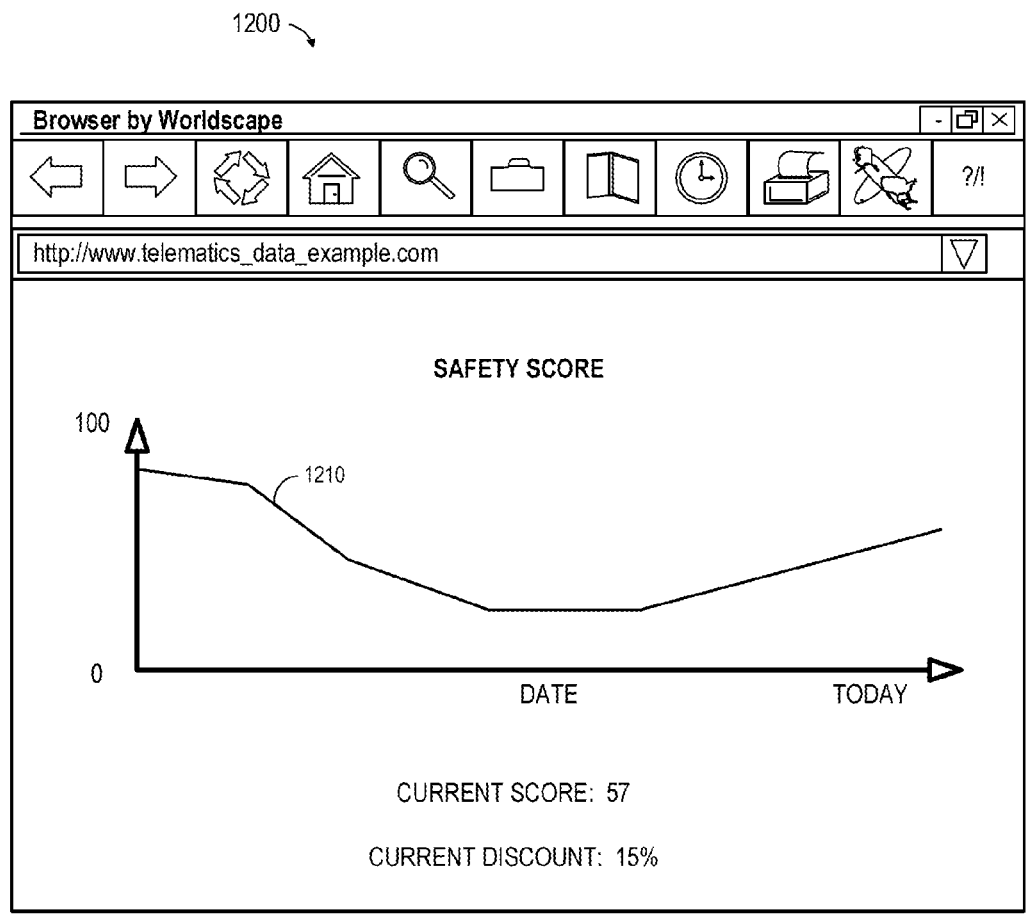
FIG. 12 illustrates a safety score display according to some embodiments.

Note that a driver's safety score will change over time based on his or her driving habits. FIG. 12 is an example of a safety score display 1200 that might be provided to a driver according to some embodiments. In particular, the display 1200 includes a graph 1210 showing the drivers safety score over a particular period of time (e.g., over the last month or year). According to some embodiments, a driver may select the period of time depicted on the graph 1210. Such a safety score display 1200 may encourage a driver to improve his or her safety score and become a less risky driver.

Figure 13:
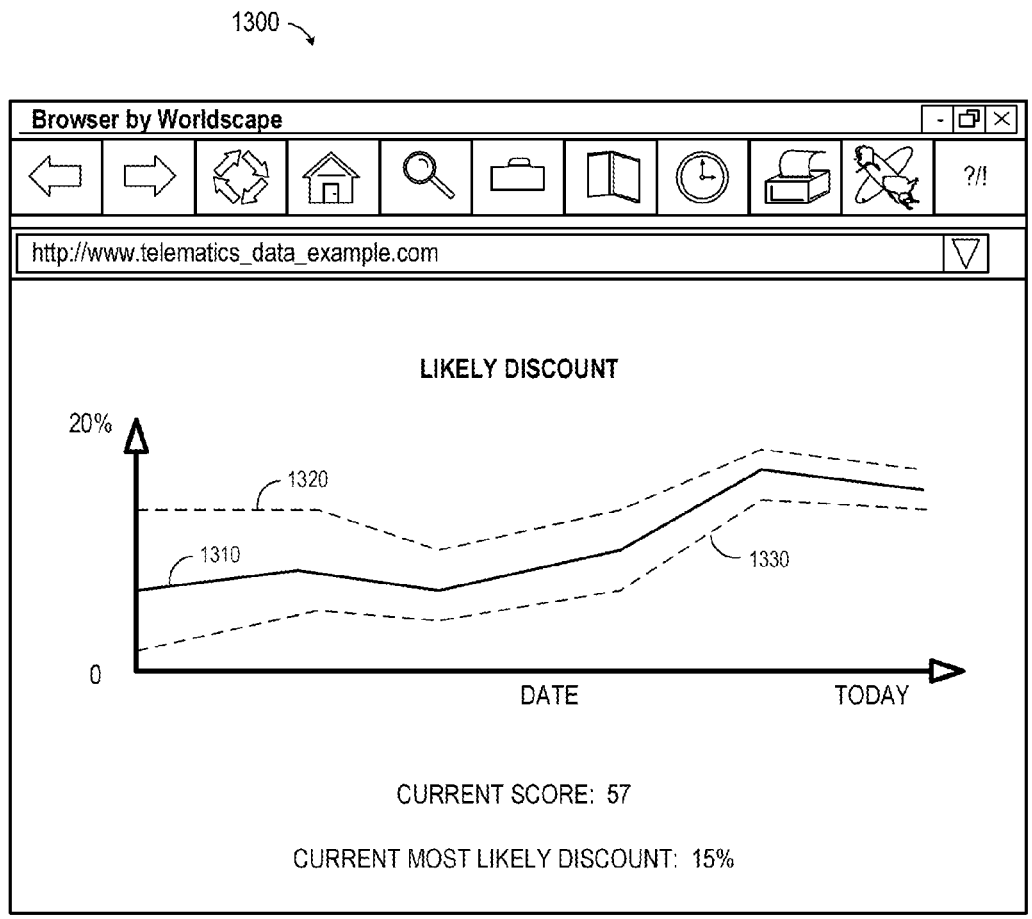
FIG. 13 illustrates a likely discount display according to some embodiments.

An insurance premium discount may be based at least in part on telematics data, a driver's safety score, and/or safety events that occur over time. According to some embodiment, a final discount value may not be determined until telematics data has been collected for a predetermined period of time and/or a predetermined number of miles. Even before the final discount value is determined, a likely discount value might be calculated based on a driver's known driving habits. For example, during a trial or initial period, a likely discount value might be calculated based on safety events that have occurred during the trial period. FIG. 13 illustrates a likely discount display 1300 according to some embodiments. In particular, the display 1300 includes a current most likely discount 1310 calculated based on the existing telematics data that has been collected for that driver. Moreover, an upper likely discount 1320 and lower likely discount 1330 may also be displayed (e.g., there might be a 90% chance that the driver's final discount will not exceed the upper likely discount 1320). Note that as more telematics data is collected over time, the upper and lower likely discounts 1320, 1330 might converge until, at the end of a trial period, the final premium discount is actually computed for the driver.

Figure 14:
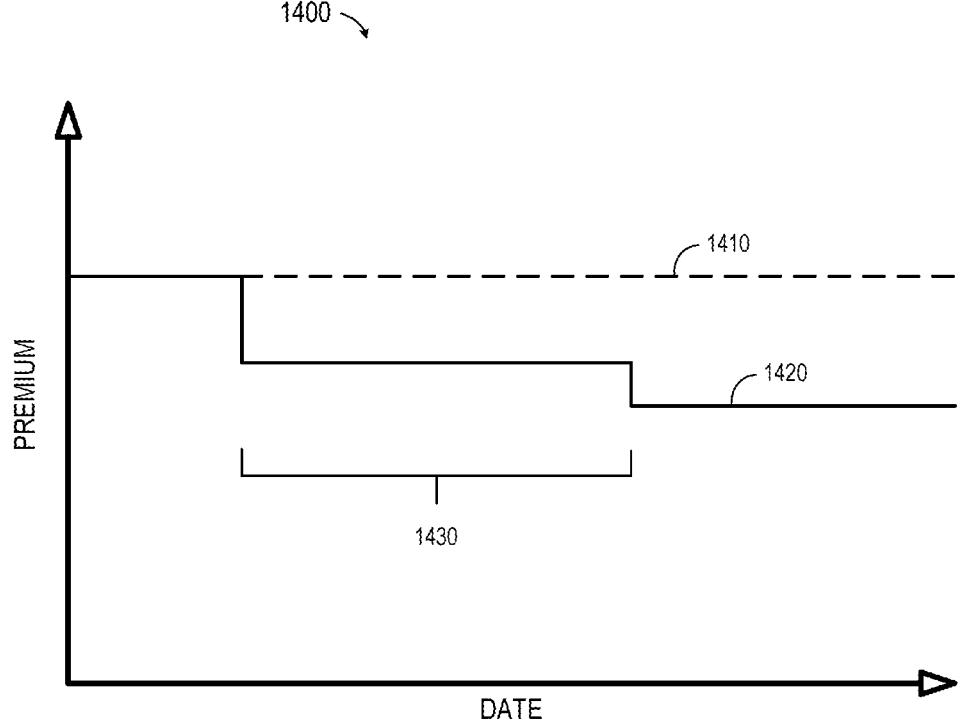
FIG. 14 illustrates how an insurance premium might change over time according to some embodiments.

According to some embodiments, an initial insurance premium discount may be provided to a driver while telematics data is collected. FIG. 14 is an illustration 1400 of how an insurance premium might change over time according to some embodiments. A baseline insurance premium associated with what a driver would pay if he or she did not participate in a telematics program is represented by a dashed line 1410 in FIG. 14 along with a solid line 1420 representing his or her actual premium. After the driver agrees to participate in the program, telematics data is collected during a pre-determined period of time 1430 (e.g., three months). During this time, the driver's insurance premium is reduced by an initial discount amount. After the pre-determined period of time 1430, a final discount amount is determined and applied to his or her insurance premium (and the final amount might be more or less than the initial discount depending on his or her driving habits).

Figure 15:
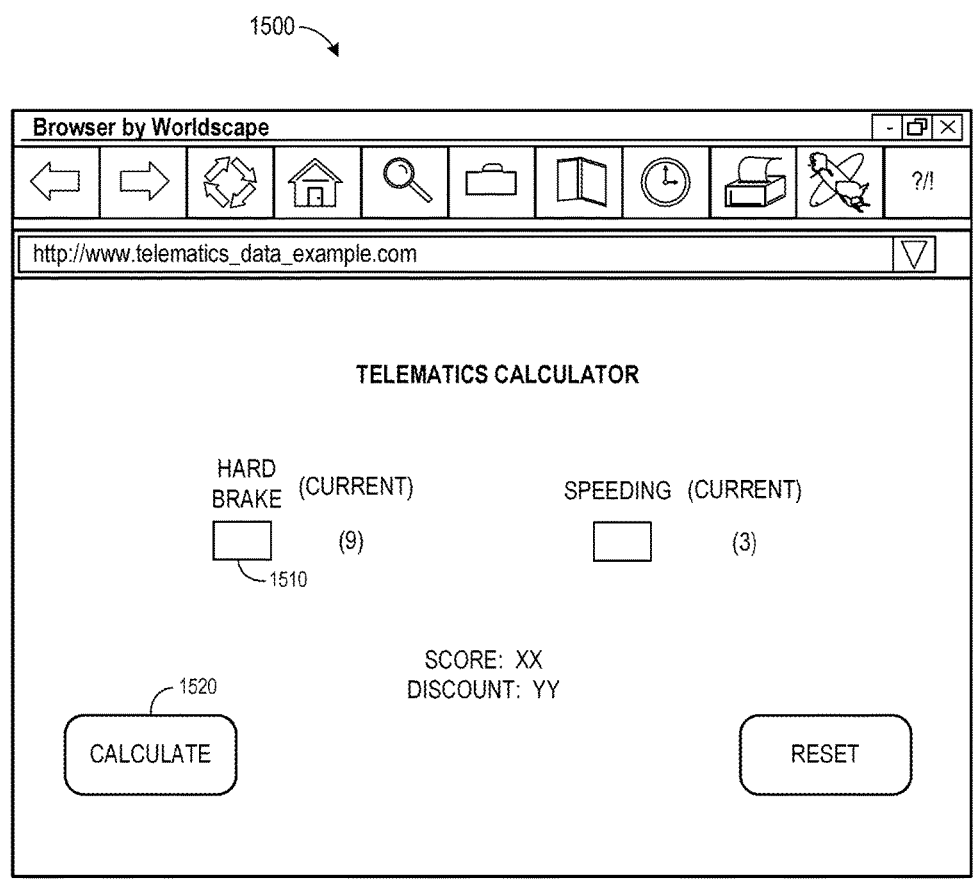
FIGS. 15 through 17 are examples of insurance discount calculator displays in accordance with some embodiments described herein.

It may be difficult for a driver to predict or understand exactly how his or her driving habits will adjust a safety score or premium discount value. According to some embodiments, a telematics calculator may be provided for a driver to reduce this problem. For example, FIG. 15 is an example of a telematics calculator 1500 display according to some embodiments. The telematics calculator 1500 includes an entry box 1510 where a user can enter a predicted number of hard brake events that he or she expects will occur each week. The calculator 1500 also displays how many hard brake events are currently occurring each week based on the collected telematics data. Similarly, the driver may enter how many speeding events he or she predicts will occur. After entering these values, the driver may activate a "calculate" icon 1520 causing the system to display a predicted score and/or premium discount value (or any other insurance benefit) based on the predicted hard brake and speeding events. In this way, a driver may be encouraged to reduce these types of events and improve his or her driving habits.

Figure 16:
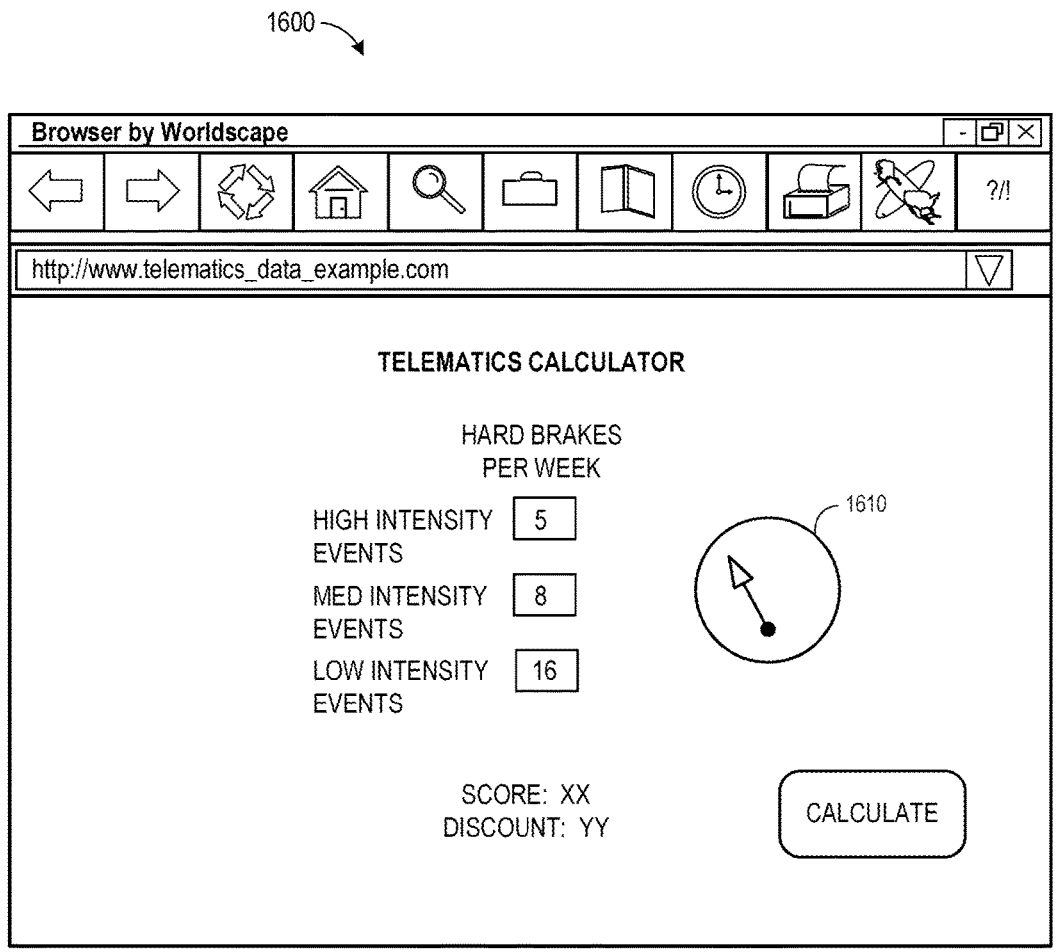

As another example, FIG. 16 is a telematics calculator 1600 where a driver can predict safety events of various severity or intensity levels. In the example of FIG. 16, a driver predicts how many "high," "medium," and "low" intensity hard brake events will occur each week. According to other embodiments, a graphical representation 1610 may be used to reflect the entered information and/or may be used instead by the driver to enter information (e.g., by rotating a gauge or dial). Based on this information, the calculator 1600 may generate and display a predicted score and/or discount value.

Figure 17:
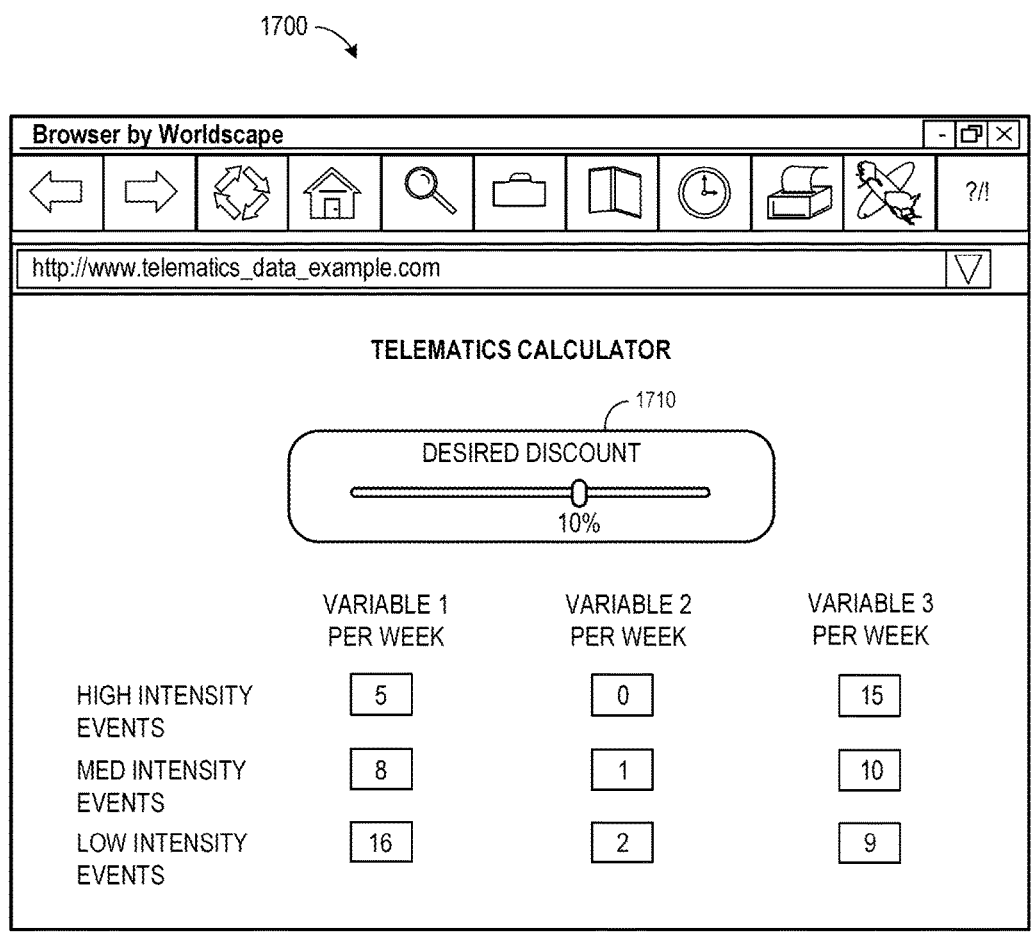

According to other embodiments, a driver might enter a desired score or premium discount value. For example, FIG. 17 is an example of an insurance discount calculator 1700 in accordance with some embodiments described herein. The calculator 1700 may receive from a driver a desired premium discount via a sliding scale 1710 (e.g., in the example of FIG. 17 the driver is interested in receiving a 10% discount). Based on the desired discount, the calculator 1700 generates a number of safety events for various types of events and/or various levels of severity. For example, the calculator 1700 might indicate that 5 high intensity hard brake events should be experienced per week in order for the driver to receive a 10% discount. The calculator 1700 may be, for example, associated with a web page, a smartphone application, and/or a kiosk and may encourage drivers to adopt less risky driving habits.

Figure 18:
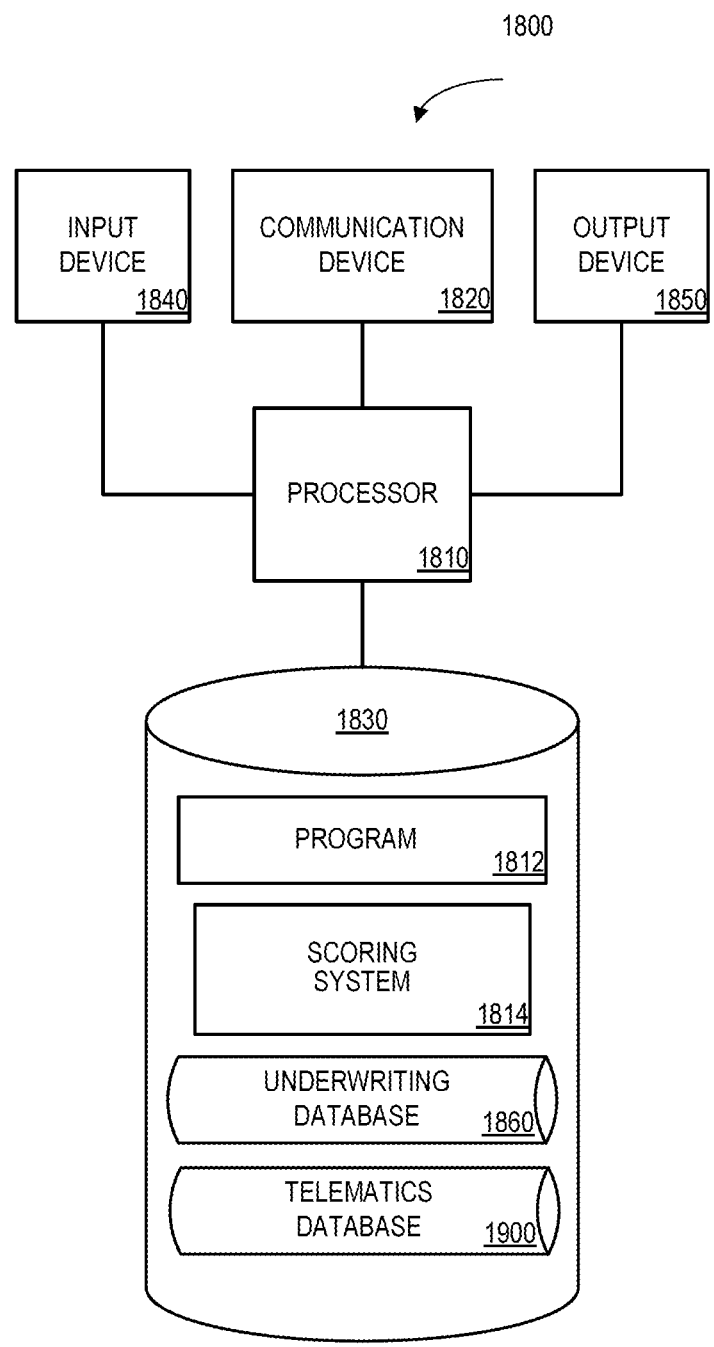
FIG. 18 is a block diagram of an insurance platform provided in accordance with some embodiments.

The processes described herein may be performed by any suitable device or apparatus. FIG. 18 is one example of an insurance platform 1800 according to some embodiments. The insurance platform 1800 may be, for example, associated with the system 108 of FIG. 1. The insurance platform 1800 comprises a processor 1810, such as one or more commercially available CPUs in the form of one-chip microprocessors, coupled to a communication device 1820 configured to communicate via a communication network (not shown in FIG. 18). The communication device 1820 may be used to communicate, for example, with one or more remote vehicles or third party services. The insurance platform 1800 further includes an input device 1840 (e.g., a mouse and/or keyboard to enter insurance discount information) and an output device 1850 (e.g., a computer monitor to display aggregated insurance reports and/or results to an administrator).

The processor 1810 also communicates with a storage device 1830. The storage device 1830 may comprise any appropriate information storage device, including combinations of magnetic storage devices (e.g., a hard disk drive), optical storage devices, and/or semiconductor memory devices. The storage device 1830 stores a program 1812 and/or scoring system 1814 for controlling the processor 1810. The processor 1810 performs instructions of the programs 1812, 1814, and thereby operates in accordance with any of the embodiments described herein. For example, the processor 1810 may receive telematics data from a vehicle. The processor 1810 may also analyze the telematics data, and/or transmit discount information to a potential entity to be insured based at least in part on a computed risk score.

Referring again to FIG. 18, the programs 1812, 1814 may be stored in a compressed, uncompiled and/or encrypted format. The programs 1812, 1814 may furthermore include other program elements, such as an operating system, a database management system, and/or device drivers used by the processor 1810 to interface with peripheral devices.

As used herein, information may be "received" by or "transmitted" to, for example: (i) the insurance platform 1800 from another device; or (ii) a software application or module within the insurance platform 1800 from another software application, module, or any other source.

In some embodiments (such as shown in FIG. 18), the storage device 1830 stores an underwriting database 1860 and/or a telematics database 1900. An example of a database that may be used in connection with the insurance platform 1800 will now be described in detail with respect to FIG. 19. Note that the database described herein is only one example, and additional and/or different information may be stored therein. Moreover, various databases might be split or combined in accordance with any of the embodiments described herein.

Referring to FIG. 19, a table is shown that represents the telematics database 1900 that may be stored at the insurance platform 1800 according to some embodiments. The table may include, for example, entries identifying users, drivers, or vehicles. The table may also define fields 1902, 1904, 1906, 1908, 1910 for each of the entries. The fields 1902, 1904, 1906, 1908, 1910 may, according to some embodiments, specify: a driver identifier 1902, a policy identifier 1904, safety events 1906, dates and times 1908, and locations 1910. The information in the telematics database 1900 may be created and updated, for example, based on information received from a vehicle sensor.

The driver identifier 1902 may be, for example, a unique alphanumeric code identifying a customer or potential customer (e.g., a person or business). The policy identifier 1904 might represent an insurance product that may be offered to the user associated with the driver identifier 1902. The safety events 1906 might indicate a type of safety event and/or a severity of the safety event. The date and time 1908 might indicate when the safety event occurred and the location 1910 might indicate where the safety event occurred (e.g., a latitude and longitude associated with the safety event). The information in the telematics database 1900 may then be used to display icons or other indications on a map display.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system for processing data for display of vehicle-telematics based data on a map display, the system comprising:
   one or more non-transitory data storage devices storing data indicative of processed telematics data, wherein said processed telematics data is based on telematics data received from a sensor within a first vehicle, the telematics data comprising location data of the first vehicle and vehicle kinematics data;
   one or more computer processors in communication with the one or more data storage devices;
   a memory, coupled to the one or more computer processors, storing program instructions which, when executed by the one or more computer processors, cause the one or more computer processors to:
      identify, based on the stored data indicative of processed telematics data, safety events of the first vehicle involving at least one of speed and deceleration of the first vehicle, and, for each of the safety events involving the first vehicle, locations of the safety events; and
      receive data indicative of safety events of other vehicles involving at least one of speed and deceleration of the other vehicles and locations of the safety events based on telematics data received from sensors in the other vehicles, and
   a map display associated with the first vehicle that displays a plurality of indications of a plurality of the identified safety events involving the first vehicle, on the map display in accordance with the locations of the safety events involving the first vehicle, comprising safety events occurring on a plurality of trips, and indications of one or more safety events associated with the other vehicles, on the map display in accordance with the locations of the safety events involving the other vehicles.

2. The system of claim 1, wherein the map display associated with the first vehicle comprises a map display on at least one of a mobile telephone, personal digital assistant and personal computer associated with a driver of the first vehicle.

3. The system of claim 1, wherein the sensor within the first vehicle comprises one of a sensor in a smartphone within the vehicle, a sensor mounted on the vehicle, and a sensor that is integrated into a data system of the vehicle.

4. The system of claim 1, wherein the sensor within the first vehicle comprises a Global Navigation Satellite System receiver.

5. The system of claim 4, wherein the location data of the first vehicle comprises latitude and longitude data.

6. The system of claim 1, wherein the sensor within the first vehicle comprises an accelerometer.

7. The system of claim 1, wherein the data indicative of processed telematics data comprises data from a third party data processing service.

8. The system of claim 7, wherein the data indicative of the processed telematics data from the third party data processing service comprises a report that does not provide an identity of the driver or vehicle.

9. The system of claim 1, wherein the safety events further comprise an occurrence of deceleration above a threshold and at least some safety events comprise an occurrence of (i) deceleration above a threshold and (ii) speeding above a threshold.

10. A computerized method for processing data for a map display of safety event data based on vehicle telematics data, the method comprising:
receiving, by one or more computer processors, data indicative of processed telematics data based on telematics data collected from a sensor within a first vehicle, wherein the telematics data includes location information and kinematics data of the first vehicle;
identifying, by the one or more computer processors, based on the data indicative of processed telematics data, safety events of the first vehicle involving one or more of a speed and a deceleration of the first vehicle, and, for each of the safety events involving the first vehicle, a location of the safety event;
receiving, by the one or more computer processors and based on telematics data received from sensors within other vehicles, data indicative of safety events associated with the other vehicles and locations of the safety events, and
displaying, on a map display associated with the first vehicle, indications of a plurality of the identified safety events involving the first vehicle, on the map display in accordance with the locations of the safety events involving the first vehicle, comprising safety events occurring on a plurality of trips, and indications of one or more of the safety events associated with the other vehicles, on the map display in accordance with the locations of the safety events involving the other vehicles.

11. The method of claim 10, wherein the sensor within the first vehicle comprises one of a sensor in a smartphone within the vehicle, a sensor mounted on the vehicle, and a sensor integrated into a data system of the vehicle.

12. The method of claim 10, wherein the data indicative of processed telematics data comprises data from a third party data processing service.

13. The method of claim 12, wherein the data indicative of the processed telematics data comprises a report that does not provide an identity of a driver or vehicle.

14. The method of claim 10, wherein the sensor within the first vehicle comprises a GNSS receiver.

15. The method of claim 10, wherein the displaying on a map display comprises displaying indications of a plurality of safety events involving the first vehicle occurring during a time period of a plurality of days.

16. The method of claim 10, wherein the display on the map display of the indications of safety events further includes a display of a single graphical icon representative of a number of the plurality of safety events that have occurred at one location.

17. The method of claim 16, wherein the single graphical icon representative of a number of safety events comprises one or both of a single graphical icon of a color representative of the number of safety events that have occurred at the location and a single graphical icon displaying a number representative of the number of safety events that have occurred at the location.

18. A system for processing data for displaying vehicle telematics based safety event data on a map display, the system comprising:
one or more non-transitory data storage devices storing data indicative of processed telematics data based on vehicle telematics data received from a sensor within a first vehicle, the telematics data comprising location information of the first vehicle and kinematics data of the first vehicle;
one or more computer processors in communication with the one or more data storage devices;
a communications device in communication with the one or more computer processors and the one or more data storage devices; and
a memory, coupled to the one or more computer processors, storing program instructions which, when executed by the one or more computer processors, cause the one or more computer processors to:
identify, based on the stored data indicative of processed telematics data, safety events for the first vehicle involving one or more of a speed and deceleration of the first vehicle, and, for each of the safety events, a location of the safety event;
receive, by the communications device, data indicative of safety events associated with other vehicles and locations of the safety events based on telematics data received from sensors within the other vehicles, and
transmit, by the communications device, a map display to a device associated with the first vehicle including indications of a plurality of the identified safety events involving the first vehicle, on the map display in accordance with the locations of the safety events involving the first vehicle, comprising safety events occurring on a plurality of trips, and indications of one or more safety events associated with the other vehicles, on the map display in accordance with the locations of the safety events involving the other vehicles.

19. The system of claim 18, wherein the sensor within the first vehicle comprises one of a sensor in a smartphone within the vehicle, a sensor mounted on the vehicle, and a sensor integrated into a data system of the vehicle, and wherein the data indicative of processed telematics data comprises data from a third party data processing service.

20. The system of claim 18, wherein the sensor comprises a GNSS receiver, and wherein the vehicle telematics data is further based on data received from an accelerometer located within the first vehicle.

* * * * *